Dec. 29, 1959  W. A. CHARBONNEAUX  2,919,391
SPEED CONTROLS FOR ELECTRIC MOTORS
Filed Sept. 23, 1954  2 Sheets-Sheet 1

INVENTOR.
WILSON A. CHARBONNEAUX
BY
ATTY.

INVENTOR.
WILSON A. CHARBONNEAUX
ATTY.

United States Patent Office 2,919,391
Patented Dec. 29, 1959

2,919,391

SPEED CONTROLS FOR ELECTRIC MOTORS

Wilson A. Charbonneaux, Dayton, Ohio

Application September 23, 1954, Serial No. 457,906

5 Claims. (Cl. 318—227)

This invention relates in general to certain new and useful improvements in speed controls for electric motors and, more particularly, to a variable speed control for regulating alternating current motors having a rotor of the squirrel cage type.

It is the primary object of the present invention to provide a variable speed control for regulating the speed of a small electric motor of the squirrel cage type without torque change over a relatively wide range of different speeds.

It is a further object of the present invention to provide an adjustable constant speed control for alternating current electric motors, which control is practically independent of voltage and frequency variation.

It is also an object of the present invention to provide variable speed controls for squirrel cage motors which include means for stopping the rotor, upon de-energization, at any one of four quarter-circle positions, that is to say, positions which are 90° apart around the circle of revolution or at any other similar series of points depending upon the number of poles.

It is an additional object of the present invention to provide speed controls of the type stated which are comparatively simple and economical in construction and which will operate efficiently and precisely for controlling either 2-phase or 3-phase motors both as to speed and pre-selected stopping points.

With the above and other objects in view, my invention resides in the novel features of form, construction, arrangement, and combination of parts presently described and pointed out in the claims.

Figure 1:
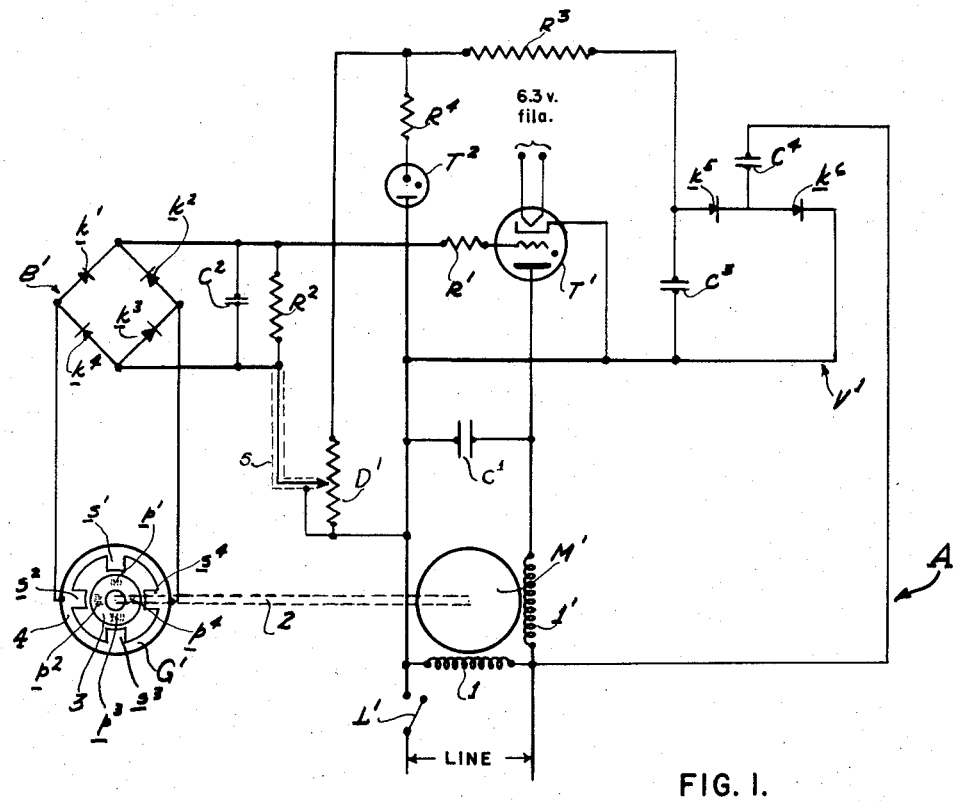
Figure 2:
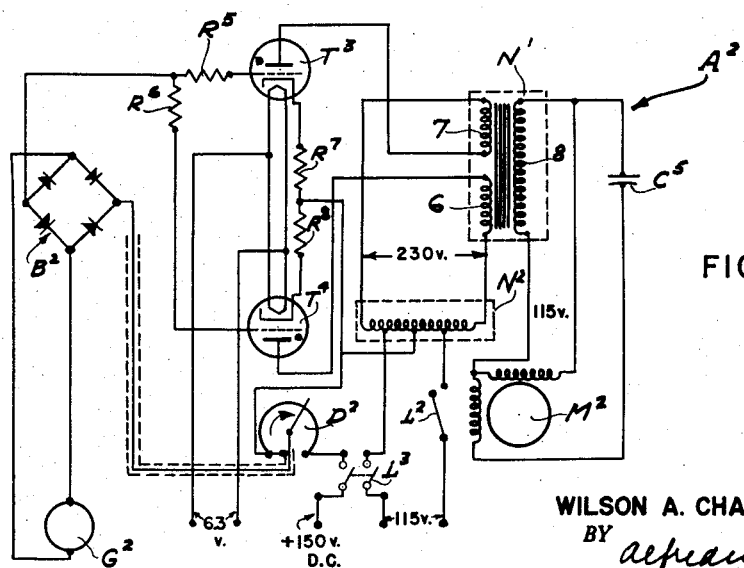
Figure 3:
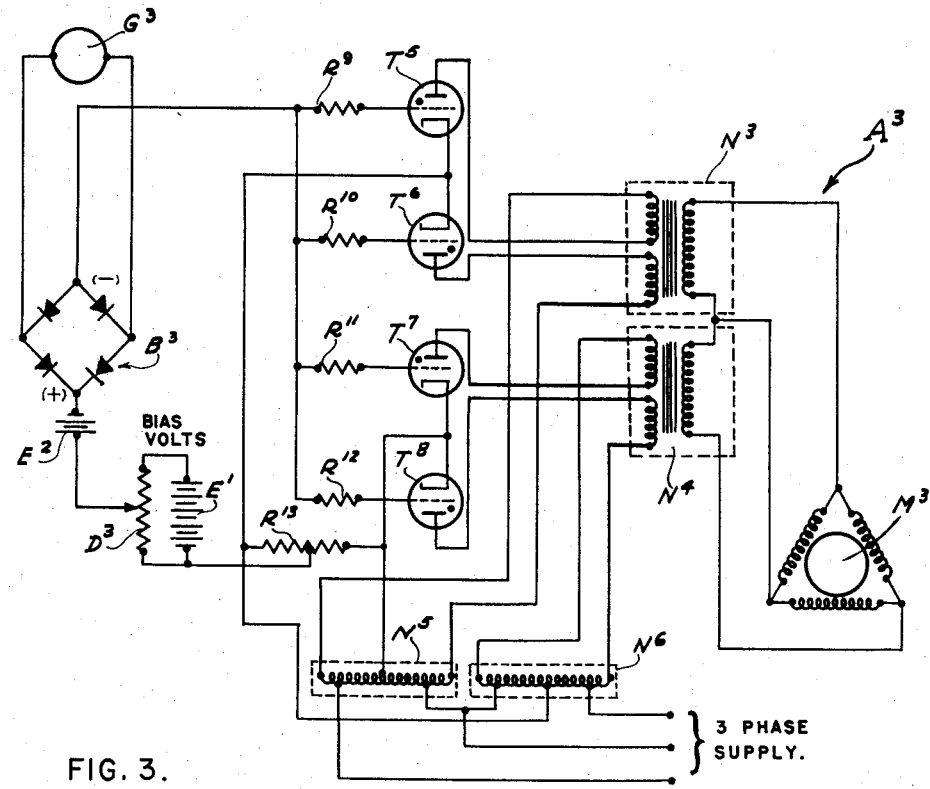
Figure 4:
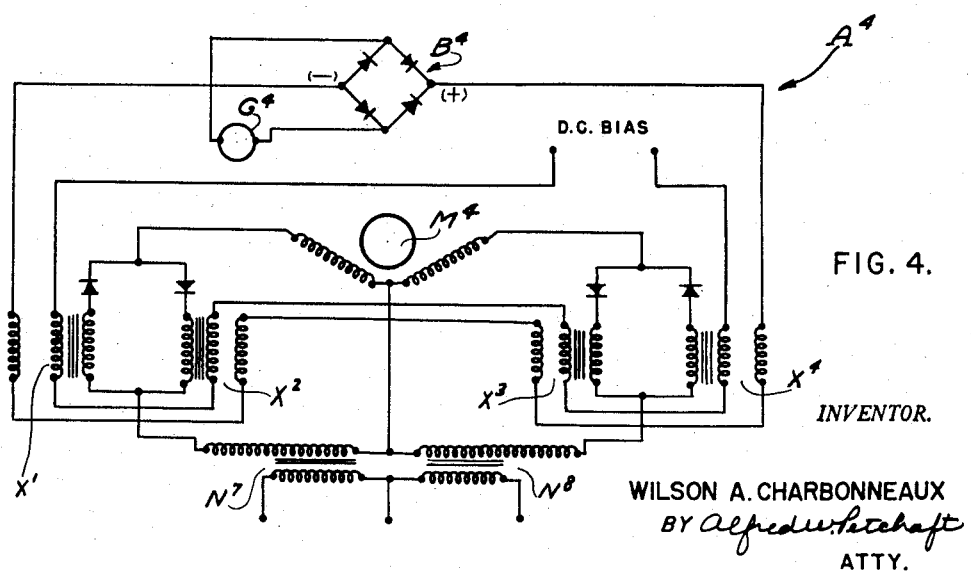

In the accompanying drawings (two sheets):

Figure 1 is a schematic wiring diagram illustrating a speed control embodying the present invention; and Figures 2, 3 and 4 are schematic wiring diagrams showing modified forms of speed controls embodying the present invention.

Broadly speaking, the present invention resides in the utilization of a small 4-pole tachometer generator which is mechanically connected to the squirrel cage motor and is capable of generating a relatively high voltage, such as, for example, 2 volts per 100 r.p.m. The alternating current output from such generator is directly proportional to its speed. Consequently, its output voltage can be fed into a rectifier bridge and rectified and combined with a pre-selected reference voltage in said rectifier bridge, so that any variation in the speed of the tachometer generator will produce a differential voltage across the bridge. This differential voltage can be applied to a regulating circuit and utilized to control the speed of the squirrel cage motor.

Referring now in more detail and by reference characters to the drawings, which illustrate practical embodiments of the present invention, the speed control A, as schematically illustrated in Figure 1, comprises a 2-phase squirrel cage motor $M^1$ having a pair of windings 1, 1', the currents in which are normally maintained out of phase from each other by 90 electrical degrees through a capacitor $C^1$. Mechanically connected to the motor $M^1$, preferably by means of a direct couple shaft 2, is a 4-pole tachometer generator $G^1$, the rotor 3 of which has four magnetic poles $p^1$, $p^2$, $p^3$, $p^4$, which are diametrically paired and are of respectively opposite polarity, so that, when the motor is de-energized, the rotor 3 will stop with its poles $p^1$, $p^2$, $p^3$, $p^4$, respectively opposite the salient poles $s^1$, $s^2$, $s^3$, $s^4$, of the stator 4. The output from the generator $G^1$ is fed into a 4-branch rectifier bridge $B^1$ consisting of four rectifiers $k^1$, $k^2$, $k^3$, $k^4$. The mid-points of the bridge $B^1$ are connected to the slider of a voltage divider or potentiometer $D^1$ and through a resistor $R^1$ to the grid of a thyratron tube $T^1$. A capacitor $C^2$ and a resistor $R^2$ are connected in parallel across the leads from the mid-points of the bridge $B^1$ and act as a filter so as to provide a ripple-free voltage across the resistor $R^2$.

The cathode of the thyratron tube $T^1$ is connected to a balancing voltage network $V^1$ which is a half-wave rectifier voltage double circuit and includes capacitors $C^3$, $C^4$, rectifiers $k^5$, $k^6$, resistors $R^3$, $R^4$, and a diode tube $T^2$. Included within the circuit is a main line switch $L^1$ for usual and conventional purposes. The network $C^4$, $k^6$, $k^5$, $C^3$, is a conventional voltage doubler circuit which provides a rectified voltage across $C^3$, the value of which is somewhat higher than would be obtained by a single half-wave rectifier. The resistor $R^4$ and the tube $T^2$ provide regulated voltage in a conventional manner and the resistor $R^3$ serves as a ballast resistor between the variable rectified line voltage across the capacitor $C^3$ and the tube $T^2$.

When the switch $L^1$ is closed, potential is applied through the line and the rectifier $k^6$ to the capacitor $C^4$, the other side of which is connected to the opposite side of line. Thus, the capacitor $C^4$ is charged to a potential equal to the line potential. During the following half-cycle, the capacitor $C^4$ is discharged, adding its potential to the line potential, the circuit being through the rectifier $k^5$, the resistor $R^3$, and through the potentiometer $D^1$ and the voltage-regulator tube $T^2$ with the resistor $R^4$. As a result of this arrangement, a potential of twice line potential is applied to the potentiometer $D^1$ and the voltage-regulator tube $T^2$ during alternate half-cycles.

Since the voltage-regulator tube $T^2$ is connected across the potentiometer $D^1$ and is connected to the resistor $R^4$, it will draw a definite amount of current at a definite potential supplied by the line voltage plus the voltage across the capacitor $C^4$. If the sum of these voltages increases or decreases, the amount of current drawn by the tube $T^2$ will increase or decrease accordingly, causing a greater or lesser voltage drop across the resistor $R^3$, thereby maintaining a constant reference potential across the potentiometer $D^1$.

The various circuit components are electrically connected as shown in Figure 1, and preferably, though not necessarily, have the following electrical values:

| | |
|---|---|
| $T^1$ | 2D21 thyratron. |
| $T^2$ | 5787 diode. |
| $R^1$ | 0.1 meg. |
| $R^2$ | 1.0 meg. |
| $R^3$ | 47K. |
| $R^4$ | 6.8K |
| $C^1$ | 0.1–600 v. |
| $C^2$ | 0.25–400 v. |
| $C^3$ | 0.1–600 v. |
| $C^4$ | 0.1–400 v. |
| $M^1$ | 2-phase 115 v. 400 cycle motor. |

The line connecting the slider of the potentiometer $D^1$ to one terminal of the resistor $R^2$ is enclosed in a shielding 5.

The motor $M^1$ will not run when the current through its two windings 1, 1', are in the same phase. Therefore, whenever the voltage balance between the bridge $B^1$ and the pre-selected voltage of the network $V^1$ becomes unbalanced due to deviation in rotational speed of the motor $M^1$ and its mechanically connected tachometer generator $G^1$, the thyratron will pass current and short out the capacitor $C^1$ and the motor torque will immediately drop toward zero. However, as soon as the speed drops, the voltage balance will be restored and the thyratron will drop out, restoring the capacitor $C^1$ to the circuit, the necessary phase differential is accordingly reestablished, and the motor will pick up speed again. The sequence of operations can occur repeatedly at the rate of 400 or more times per second. In use, therefore, the potentiometer is shifted to some selected setting to establish a "controlled" or selected speed and, of course, this speed is always appreciably less than the maximum or top speed of which the motor $M^1$ is capable if allowed to run free on the line. Since the "controlled" or selected speed is always below the top speed of the motor $M^1$, the motor will always tend to speed up. However, if the motor speed becomes greater than the selected speed, the tachometer generator $G^1$ will greatly increase its speed and its output will over-balance the reference voltage established by the network $V^1$. This imbalance will impose a potential upon the grid which causes the thyratron $T^1$ to fire or conduct and, as soon as the thyratron $T^1$ becomes conductive, it operates to short out the capacitor $C^1$, as has been above pointed out, and, so long as the thyratron continues to conduct, the windings 1, 1', are in phase, so the motor $M^1$ is, in effect, switched off. The motor speed, thereupon, drops off until it is at, or below, the selected speed. As soon as the motor speed reaches or drops below the selected speed, the voltage generated by the tachometer generator $G^1$ drops and the potential imposed upon the grid of the thyratron $T^1$ is correspondingly changed so that the thyratron tube is biased off or ceases to conduct. Consequently, the capacitor $C^1$ is no longer shorted and the windings 1, 1', are returned to 90° out-of-phase relationship, so the motor $M^1$ again begins to pick up speed. This on-and-off condition, as has been above pointed out, can occur many hundreds of times per minute and, consequently, the motor $M^1$ is thereby caused to operate at the selected speed as established by the setting of the potentiometer $D^1$. Whenever the motor $M^1$ is deenergized for a recognizable period of time, as would be the case when the line switch $L^1$ is opened, the stator poles $p^1$, $p^2$, $p^3$, $p^4$, of the generator $G^1$ will pull the rotor into alignment with the salient poles $s^1$, $s^2$, $s^3$, $s^4$, respectively, of the stator 4, serving as "detent means," so to speak. Consequently the motor $M^1$ will stop in any one of four pre-selected quarter-circle positions.

In order to provide an even broader range and greater degree of precision, it is possible to provide a speed control $A^2$, as shown in Figure 2, comprising a motor $M^2$, a tachometer generator $G^2$, a rectifier bridge $B^2$, a potentiometer $D^2$, thyratron tubes $T^3$, $T^4$, resistors $R^5$, $R^6$, $R^7$, $R^8$, a variable condenser or capacitor $C^5$, a transformer $N^1$ having two primaries 6, 7, and a secondary 8, respectively. Also included in the circuit are an auto-transformer $N^2$ and line switches $L^2$, $L^3$.

These components are connected in a circuit as shown in Figure 2 and have the following values:

| | |
|---|---|
| $T^3$ and $T^4$ | 2D21. |
| $R^5$ and $R^6$ | 0.1 meg. |
| $R^7$ and $R^8$ | 10 ohms or less. |
| $C^5$ | 0.1–600 v. |
| $M^2$ | 2-phase 115 v. 400 cycle motor. |

The transformer windings 6, 7, are arranged in opposed relationship. The center tap of the auto-transformer $N^2$ is connected in common to the cathodes of the two thyratrons $T^3$, $T^4$. One end tap of the auto-transformer $N^2$ is connected in series through the primary 6 to the plate of the thyratron $T^4$ and the other end of the auto-transformer is connected in series through the other primary 7 to the plate of the other thyratron $T^3$. Thereby a neutral plane is established from which the thyratrons $T^3$, $T^4$, will respectively operate positively on alternate half cycles. It will be apparent that the thyratron $T^3$ will pass current when the end tap of the auto-transformer $N^2$, to which it is connected, is positive with respect to the center tap. Similarly, the thyratron $T^4$ will pass current when the end tap, to which its plate is connected, is positive with respect to the center tap. Consequently, the secondary voltage of the transformer $N^1$ will be of sinusoidal wave-form and will be equal in value to the voltage of each of the two primaries, less the voltage drop across each of the two thyratrons $T^3$, $T^4$, assuming that the grids thereof allow conduction during the entire half cycle of each tube. If the grid voltage is changed by appropriate adjustment of the potentiometer $D^2$, the thyratrons $T^3$, $T^4$, can be made to fire at various times of the half-cycle and the total amount of energy supplied to the motor $M^2$ is thereby reduced. However, since the voltage pulses are substantially of the same magnitude, the torque pulsations are of similar magnitude but of varying duration. Since the grid voltage depends upon the unbalance between the rectified generated voltage of the tachometer generator $G^2$ and the selected fixed reference voltage established by the setting of the potentiometer $D^2$, a motor speed will be reached where the grid voltage will be just sufficient to maintain control. In the case of this present modification also, the potentiometer $D^2$ is shifted to some setting to establish a "controlled" or selected speed which, again, is appreciably less than the maximum speed of the motor $M^2$ if it is permitted to run directly on the line without interposition of any control. The two primaries 6, 7, of the transformer $N^1$ operate to energize the transformer $N^1$ on opposite half-cycles. Thus, if the primaries 6, 7, of the transformer $N^1$ were connected directly to the auto-transformer $N^2$, the 2-phase windings of the motor would operate in the usual and conventional manner. However, the thyratrons $T^3$, $T^4$, operating as above pointed out upon alternate half-cycles, will be biased off whenever the speed of the motor $M^2$ exceeds the selected speed established by the setting of the potentiometer $D^2$ as a result of the imbalance between the reference voltage and the generated voltage from the tachometer generator $G^2$. Thus, whenever the motor $M^2$ reaches a speed in excess of the selected speed, the thyratrons will become non-conductive for short intervals so that the primaries 6, 7, are not continuously energized, but, instead, are, in a manner of speaking, switched off so that the motor will slow down. As soon as the motor $M^2$ and the tachometer generator $G^2$, which is mechanically connected thereto, slow down sufficiently so that the speed drops below the selected voltage, the thyratrons $T^3$, $T^4$, will again become conductive and the transformer primaries 6, 7, will again be energized so that the motor $M^2$ will again commence to speed up. This on-and-off functioning of the control system is extremely rapid so that the increment of speed variation of the motor $M^2$ above and below the selected speed is very small and the motor $M^2$ can be held to the selected speed within extremely precise limits. One of the motor windings of Figure 2 may be connected directly across the supply voltage, thereby reducing the load on the control transformers and thyratrons by approximately one-half.

The principle of the present invention can also be applied to a 3-phase motor, as shown in the speed control $A^3$ in Figure 3, which includes a motor $M^3$, a tachometer generator G³, a rectifier bridge B³, transformers N³, N⁴, auto-transformers N⁵, N⁶, thyratron tubes T⁵, T⁶, T⁷, T⁸, resistors R⁹, R¹⁰, R¹¹, R¹², R¹³, a potentiometer D³, and D.C. bias voltage sources E¹, E². These components are connected in the circuit shown in Figure 3 and function substantially in the same manner as described in connection with the motor control A² previously described.

In other words, the schematic diagram of Figure 3 illustrates the application of this invention to the speed control of polyphase motors. For purposes of illustration, the speed control system is shown as controlling the speed of a 3-phase motor. It consists of a motor M³ having three windings spaced apart by substantially 120 electrical degrees and supplied with current by transformers N³ and N⁴. A tachometer generator G³ and a rectifier bridge indicated generally by the character B³ is adapted to supply a rectified voltage proportional to the speed of the motor M³, as described in Figure 1. A source of reference potential is supplied to the potentiometer D³ by a battery E¹, and the differential voltage is applied, as described above, to the grids of tubes T⁵, T⁶, T⁷, T⁸, two tubes of which are connected in one lead of each controlled phase of the motor M³. Each tube is connected as shown so as to energize one winding of transformers N³, N⁴ and to thereby supply current as required to the motor M³. Auto-transformers N⁵, N⁶, may be used to supply current to the tubes, or the transformers N⁵, N⁶, may be provided with separate windings if it is desired to isolate completely the system from the supply lines. Transformers N³ and N⁴ may be omitted and the windings placed within the motor M³, as described above in Figure 2.

This motor control system operates in exactly the same manner as described in connection with Figure 2, the only change being that there are two transformers N³, N⁴, instead of the single transformer N¹ and, furthermore, the two transformers N³, N⁴, are arranged as a 3-phase current supply to a delta connected 3-phase motor M³. The transformers N³, N⁴, function in their respective phases exactly as the transformer N¹ previously described in connection with the embodiment shown in Figure 2, that is to say, the two primaries of the transformers operate on opposite half-cycles and are cut in and out of the circuit by the controlling pairs of thyratrons T⁵, T⁶, and T⁷, T⁸, respectively, so that all of the phases will be on for equal intervals in successive order but at any instant the duration of these equal intervals may change, depending upon how long the thyratrons are in conductive or non-conductive configuration responsive to the imbalance between the reference voltage and voltage emanating from the tachometer generator G³.

In certain applications where long-life and uninterrupted operation are extremely essential but where restrictions of weight and size are not important, it is possible to employ a speed control A⁴, as shown in Figure 4, in which magnetic amplifiers are substituted for the thyratron tubes. The circuit, as shown in Figure 4, is applicable to either a 2-phase motor or a motor of the 3-phase open-delta type. The circuit consists of a motor M⁴, the windings of which are supplied by current from transformers N⁷ and N⁸. Interposed in one lead of each phase supplied to the motor M⁴ is a saturable core reactor, connected as is usually for devices of this character. Each reactor is provided with two direct-current regulating windings, such as X¹ and X² for one reactor, and X³ and X⁴ for thet other reactor. Each of the regulating windings X¹, X², X³, and X⁴, are provided with two coils arranged to counteract each other. One coil of each winding is supplied with direct current from a constant-potential source, such as from a battery or any other suitable source. These coils are so connected that the core of the reactor is maintained in a saturated condition so that the windings of the motor M⁴ are supplied with current at substantially full voltage, that is, the voltage drop through the reactor is a minimum. The other coils of the several windings are supplied with rectified direct current from a generator G⁴ and a rectifier bridge network B⁴, as described above. The arrangement is such that as the speed of the motor M⁴ is increased, an increased current flows in the reactor coils connected thereto. Because these coils are arranged to produce a magnetic flux opposite to that generated by the coils excited by the constant-potential circuit, the net saturating flux in the reactor is decreased, the alternating current voltage drop of the reactor increases, and less voltage is available at the motor windings. When the motor speed is decreased, the tachometer generator voltage is decreased, less current flows in the reactor control coils, less of the constant-potential coil flux is opposed, and the voltage supplied to the motor windings is increased. Thus, the speed of the motor M⁴ can be controlled at any preselected value determined by the difference in effect of the constant-potential reference voltage and the tachometer generator voltage.

It should be understood that changes and modifications in the form, construction, arrangement and combination of the several parts of the speed controls for electric motors may be made and substituted for those herein shown and described without departing from the nature and principle of my invention.

Having thus described my invention, what I claim and desire to secure by Letters Patent is:

1. A speed control for an inductive motor having a plurality of separate windings and being capable of a top speed substantially in excess of its desired operating speed range, said speed control comprising electric current generating means operatively connected to said motor and being adapted to generate a current the voltage of which varies with the speed of the motor, a source of reference voltage, means by which the output of the generating means and the reference voltage may be combined to produce a differential voltage when the motor speed exceeds the selected speed, a transformer including at least one secondary winding connected to the motor windings, said transformer furthermore including at least two primary windings, at least two thyratrons the plates of which are connected to said primary windings, said thyratrons also being provided with grids upon which said differential voltage may be impressed for causing the thyratrons to cut on and off intermittently whereby to energize and de-energize the primary windings for periods of varying duration responsive to fluctuations in said differential voltage.

2. A speed control for an induction motor having a plurality of separate windings and being capable of a top speed substantially in excess of its desired operating speed range, said speed control comprising electric current generating means operatively connected to said motor and being adapted to generate a current the voltage of which varies with the speed of the motor, a source of reference voltage, means by which the output of the generating means and the reference voltage may be combined to produce a differential voltage when the motor speed exceeds the selected speed, a transformer including a secondary winding connected to the motor windings, said transformer furthermore including two primary windings, a pair of thyratrons the plates of which are connected to said primary windings, said thyratrons also being provided with grids upon which said differential voltage may be impressed for causing the thyratrons to cut on and off intermittently whereby to energize and de-energize the primary windings for periods of varying duration responsive to fluctuations in said differential voltage.

3. A speed control for an induction motor having a plurality of separate windings, said speed control comprising electric current generating means operatively connected to said motor and being adapted to generate a current the voltage of which varies with the speed of the motor, a transformer including at least one secondary winding connected to the motor windings, said transformer furthermore including at least two primary windings, a four-branch rectifying bridge connected to the generating means, a source of reference voltage connected to one mid-point of said bridge, and at least one pair of thyratrons the plates of which are connected to said primary windings, said thyratrons also being provided with grids connected to the other mid-point of said bridge and being actuable responsive to the differential voltage between the reference voltage and the voltage across the output of the bridge for modifying the motor current as the speed of the motor varies.

4. A speed control for an induction motor having a plurality of separate windings and being capable of a top speed substantially in excess of its desired operating speed range, said speed control comprising electric current generating means operatively connected to said motor and being adapted to generate a current the voltage of which varies with the speed of the motor, and a plurality of thyratrons the plates of which are operatively connected to each of two or more motor windings through intermediate transformer means, said thyratrons also having grids responsively connected to the generating means for causing the thyratrons to apply current to each of the motor windings in pulses of equal duration, the duration of such pulses being varied responsive to fluctuations in the output of the current generating means.

5. A speed control for an induction motor having a plurality of separate windings and being capable of a top speed substantially in excess of its desired operating speed range, said speed control comprising a generator driven by the motor and being adapted to generate a current the voltage of which varies directly with thet speed of the motor, said generator being provided with magnetic detent means operative when the generator is de-energized for stopping the generator in a selected position, a source of reference voltage, means by which the output of the generating means and the reference voltage may be combined to produce a differential voltage when the motor speed exceeds the selected speed, a transformer including at least one secondary winding connected to the motor windings, said transformer furthermore including at least two primary windings, at least two thyratrons the plates of which are connected to said primary windings, said thyratrons also being provided with grids upon which said differential voltage may be impressed for causing the thyratrons to cut on and off intermittently whereby to energize and de-energize the primary windings for periods of varying duration responsive to fluxuations in said differential voltage.

References Cited in the file of this patent
UNITED STATES PATENTS

| 1,353,815 | Meyer | Sept. 21, 1920 |
| 2,437,301 | Lobosco | Mar. 9, 1948 |
| 2,462,751 | Koehler | Feb. 22, 1949 |
| 2,484,089 | Haynes | Oct. 11, 1949 |
| 2,554,956 | Reeves | May 29, 1951 |
| 2,586,397 | Tuttle | Feb. 19, 1952 |
| 2,676,292 | Spencer | Apr. 20, 1954 |